United States Patent
Nakagawa et al.

[11] 3,919,239
[45] Nov. 11, 1975

[54] OXAZOLIDINE DERIVATIVES

[75] Inventors: Kazuyuki Nakagawa; Shiro Yoshizaki; Nanami Murakami; Hideo Mori; Michiaki Tominaga, all of Tokushima, Japan

[73] Assignee: Otsuka Pharmaceutical Co., Ltd., Tokyo, Japan

[22] Filed: Dec. 3, 1973

[21] Appl. No.: 420,803

[30] Foreign Application Priority Data
Dec. 2, 1972  Japan............................... 47-120954
Dec. 2, 1972  Japan............................... 47-120955

[52] U.S. Cl..... 260/288 CE; 260/287 K; 260/288 R; 260/289 K; 424/258
[51] Int. Cl.²...................................... C07D 215/20
[58] Field of Search........ 260/288 R, 289 R, 287 R, 260/288 CE, 287 K

[56] References Cited
UNITED STATES PATENTS
3,340,266  9/1967  Howe et al...................... 260/288 R

*Primary Examiner*—Donald G. Daus
*Assistant Examiner*—Mary C. Vaughn
*Attorney, Agent, or Firm*—Sughrue, Rothwell, Mion, Zinn & Macpeak

[57] ABSTRACT

Oxazolidine derivatives represented by the formula (I)

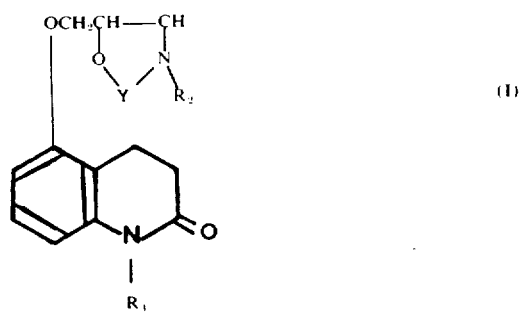

wherein $R_1$, $R_2$ and Y are hereinafter defined, having a β-adrenergic blocking activity and a process for producing the above oxazolidine derivatives are disclosed.

22 Claims, No Drawings

OXAZOLIDINE DERIVATIVES

BACKGROUND OF THE INVENTION

1. Field of the Invention

This invention relates to oxazolidine derivatives and a process for producing the same. More particularly, this invention relates to 3-alkyl-5-[(3,4-dihydro-5-carbostyril)oxymethyl]oxazolidine derivatives and a process for producing 3-alkyl-5-[(3,4-dihydro-5-carbostyril)oxymethyl]oxazolidine.

2. Description of the Prior Art

It is well known that certain carbostyril derivatives exhibit useful pharmaceutical activities. Representative compounds of this type have been disclosed in *Journal of Medical Chemistry*, Vol. 15, No. 3, pp 260 – 266 (1972), Japanese Patent Publication No. 38789/1971 and *Chemical Abstracts*, 62, 1b 212e (1965), etc. However, these prior art references do not teach that the compounds having a 3-alkyl-5-oxymethyloxazolidine or oxazolidinone-(2) group at 5-position of a carbostyril moiety possess an excellent $\beta$-adrenergic blocking activity.

The present inventors have found that 3,4-dihydrocarbostyril derivatives having a 3-substituted-aminopropoxy group at 5-, 6-, 7- or 8-position of the carbostyril moiety possess a useful $\beta$-adrenergic blocking activity as described in our copending application Ser. No. 325,981 filed on Jan. 23, 1973. As a result of further investigation on other derivatives, it was unexpectedly found that that compounds having a completely different substituent, a 3-alkyl-5-oxymethyloxazolidine group or a 3-alkyl-5-oxymethyloxazolidinone-(2) group, at the 5-position exhibit the $\beta$-adrenergic blocking activity and that these compounds can easily be prepared from the corresponding 5-(2-hydroxy-3-alkylamino)propoxy-3,4-dihydrocarbostyril derivatives, retaining the $\beta$-adrenergic blocking pharmacological activity.

SUMMARY OF THE INVENTION

The present invention provides novel 3-alkyl-5-[(3,4-dihydro5-carbostyril)oxymethyl]oxazolidine or oxazolidinone-(2) derivatives having the formula (I)

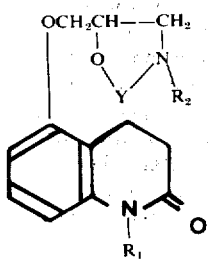

(I)

wherein $R_1$ represents a hydrogen atom, a straight or branched chain alkyl group having 1 to 4 carbon atoms, an alkenyl group having 2 to 4 carbon atoms or an aralkyl group having 1 to 2 carbon atoms in the alkyl moiety thereof, $R_2$ represents a straight or branched chain alkyl group having 1 to 4 carbon atoms, and Y represents $>C=O$ or $>CH-R_3$ wherein $R_3$ represents a hydrogen atom, a straight or branched chain alkyl group having 1 to 3 carbon atoms or a phenyl group.

This invention also provides a process for preparing the above 3-alkyl-5-[(3,4-dihydro-5-carbostyril)oxymethyl]oxazolidine or oxazolidinone-(2) derivatives represented by the formula (I).

The 3-alkyl-5-[(3,4-dihydro-5-carbostyril)oxymethyl]oxazolidine or oxazolidinone-(2) derivatives of the formula (I) are useful as $\beta$-adrenergic blocking agents.

DETAILED DESCRIPTION OF THE INVENTION

In accordance with the process of this invention, the compounds represented by the formula (I) wherein Y is $>C=O$, i.e., oxazolidinone-(2), can be prepared by reacting a 5-(2-hydroxy-3-alkylamino)propoxy-3,4-dihydrocarbostyril derivative of the formula (II)

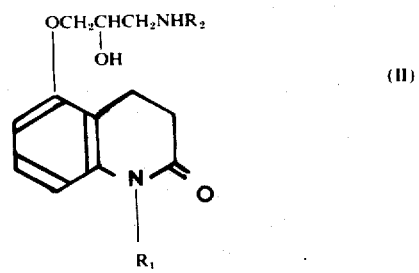

(II)

wherein $R_1$ and $R_2$ are as defined above, with phosgene.

This reaction is preferably conducted in the presence of an acid acceptor and an inert organic solvent. Suitable examples of acid acceptors which can be used in the process of this invention are alkali metal hydroxides, carbonates or bicarbonates such as sodium hydroxide, potassium hydroxide, potassium carbonate, sodium carbonate, sodium bicarbonates and the like. These acid acceptors generally used in a proportion of 1 to 1.5 moles per 1 mole of the carbostyril derivative (II).

Suitable examples of the inert organic solvents are ethers such as diethyl ether, dioxane, tetrahydrofuran and the like or aromatic hydrocarbons such as benzene, toluene, xylene and the like. The inert organic solvent is generally used in a volume of 5 to 20, preferably 8 to 15 times the amount of the reactants, and phosgene can be introduced into a solution of the compound (II) or can be dissolved previously in an appropriate amount of the solvent and the solution can be combined with the compound (II).

The reaction is generally conducted using an equimolar amount to a slightly molar excess amount of phosgene, preferably 1 to 1.5 moles of phosgene per one mole of the 5-(2-hydroxy-alkylamino)propoxy-3,4-dihydrocarbostyril derivative (II).

The reaction temperature is not critical and the reaction proceeds smoothly at room temperature (about 20° to 30°C), but an elevated temperature, for example, 40° to 60°C can be used advantageously to accelerate the reaction rate. The reaction is generally completed within a period of about 5 to about 24 hours at room temperature and about 3 to about 8 hours at a temperature of 40° to 60°C.

After completion of the reaction, the desired product can be recovered from the reaction mixture using any conventional procedure, for example, cooling the reaction mixture to crystallize the product or concentrating the reaction mixture, and the resulting product can be purified using well-known techniques such as column chromatography packed with silica gel, for example, Wako Gel C-200 (available from Wakojunyaku K.K., Japan) using acetone as an eluant or recrystallization from a solvent such as acetone, isopropyl alcohol, benzene, cyclohexane, ligroin and the like.

The compounds of this invention having the formula (I) wherein Y represents >CH-R₃, i.e., oxazolidine, can be prepared by reacting a 5-(2-hydroxy-3-alkylamino)propoxy-3,4-dihydrocarbostyril derivative of the formula (II) above with an aldehyde of the formula (III)

   (III)

wherein R₃ is as defined above.

The reaction between the carbostyril derivative (II) and the aldehyde (III) can be effected in the absence of a solvent but the reaction proceeds more smoothly in an inert organic solvent. Suitable examples of solvents which can be used in the reaction are ethers such as diethyl ether, dioxane, tetrahydrofuran and the like or aromatic hydrocarbons such as benzene, toluene, xylene and the like. These reaction solvents are usually used in a volume of 5 to 50, preferably 20 to 35 times the amount of the compound (II). If desired, a dehydrating agent such as polyphosphoric acid can be used in the reaction, but the reaction generally proceeds satisfactorily without using a dehydrating agent.

The reaction is generally conducted using 1 to 5 moles, preferably 3 to 5 moles of the aldehyde (III), per one mole of the 5-(2-hydroxy-3-alkylamino)propoxy-3,4-dihydrocarbostyril derivatives.

The reaction temperature is not critical and the reaction proceeds at room temperature (about 20° - 30°C), but it is usually advantageous to heat the reaction system at the refluxing temperature of the solvent used, i.e., 80° to 200°C, while azeotropically removing the water formed during the reaction. The reaction is generally completed with a period of 3 to 8 hours.

Aldehydes represented by the formula (III) include lower aliphatic aldehydes and aromatic aldehydes, for example, formaldehyde, acetaldehyde, propionaldehyde, butyraldehyde, benzaldehyde and the like. These aldehydes are not only well known in the art but also generally commercially available.

The 5-(2-hydroxy-3-alkylamino)propoxy-3,4-dihydrocarbostyril derivative (II) used as a starting material in the preparation of the compounds of the general formula (I) is disclosed in Belgian Pat. No. 794,669 published on May 16, 1973, and can be prepared from 3,4,5,6,7,8-hexahydrocarbostyril-5-one by reacting the same with a brominating agent to obtain the corresponding 8(or 6)-bromo-3,4,5,6,7,8-hexahydrocarbostyryl-5-one which is then subjected to heat treatment according to the following reaction shceme:

wherein R₁ is as defined above. The resulting 5-hydroxy-3,4-dihydrocarbostyril (VI) is then reacted with an epihalohydrin in the presence of a basic compound to produce the corresponding 3,4-dihydrocarbostyril derivative having the formula (VII)

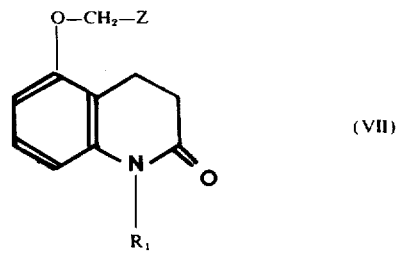

wherein R₁ is as defined above, and Z represents a

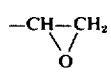

group or

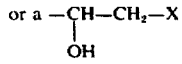

group, wherein X represents a halogen atom.

Suitable examples of the epihalohydrin are epibromohydrin, epichlorohydrin or epiiodohydrin. Suitable basic compounds are alkali metals, alkali hydroxides, alkali carbonates and organic bases. Preferred examples of the basic compounds are sodium metal, potassium metal, sodium hydroxide, potassium hydroxide, sodium carbonate, potassium carbonate, piperidine, piperazine, pyridine, lower alkylamines such as diethylamine, triethylamine, methylamine and the like. The reaction between compounds (VI) and epihalohydrin can be carried out in the absence of solvents, but preferably carried out in the presence of an inert solvent, for example, lower alkanols, water, lower alkyl acetate and ketones. Suitable examples of lower alkanols are methanol, ethanol, isopropanol, n-propanol, n-butanol and the like. Suitable examples of lower alkyl acetates are ethyl acetate, methyl acetate, propyl acetate, and the like. Suitable examples of ketones are acetone and methyl ethyl ketone. Although any combination of the solvent and basic compound can be used, it is preferred to select the solvent depending upon the basic compound used. In preferred embodiments, lower alkanols are used with alkali metals and water with alkali hydroxides. When the basic compounds are organic bases

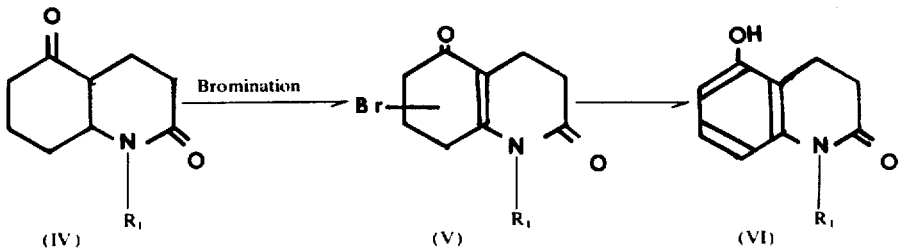

the reaction can be carried out without using any solvent or with a lower alkanol, lower alkyl acetate or ketone.

The reaction temperature can range from 0° to the boiling point of the solvent used, preferably from 50° to a boiling point of the solvent, for a period of from 4 to 6 hours, preferably from 4 to 5 hours, when alkali metals or alkali hydroxides are used as the basic compound, and the reaction temperature can range from 0° to 120°C, preferably 80° to 120°C for a period of from 4 to 6 hours, preferably 5 to 6 hours, when organic bases are used as the basic compound. The reaction is usually carried out at atmospheric pressure. In this reaction, both 5-(2,3-epoxy)propoxy-3,4-dihydrocarbostyril derivatives and 5-(2-hydroxy-3-halo)propoxy-3,4-dihydrocarbostyril derivatives (formula (VII) wherein X is

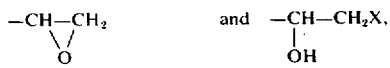

respectively) are obtained as a reaction product. The proportion of the 2,3-epoxy compound and 2-hydroxy-3-halo compound in the product varies with the type of the basic compounds used. The former compound is produced predominantly when the reaction is conducted in the presence of strongly basic compounds such as alkali metals and alkali hydroxides as recited above and the latter compound is produced predominantly when the reaction is conducted in the presence of weakly basic compounds such as organic bases, in particular piperidine, and the epihalohydrin is used in excess.

These products can be separated from each other by conventional procedures, for example, fractional crystallization, but preferably are separated by column chromatography using a column packed with active alumina, silica gel or the like.

The intermediate of formula (VII) wherein X represents

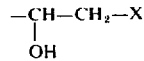

(X is as defined above) can also be prepared by reacting the 5-hydroxy-3,4-dihydrocarbostyril derivative of the formula (IV)

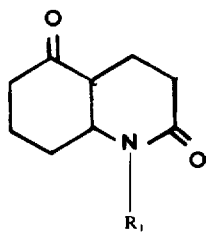

(IV)

wherein $R_1$ is as defined above, with a 3-halogeno-1,2-propanediol of the formula (VIII)

(VIII)

wherein X is as defined above. It is preferred to react 1 to 5 moles of the compound of formula (VIII), more preferably 1 to 3 moles, per mole of the compound of formula (IV). This reaction is carried out at atmospheric pressure for 3 to 6 hours, preferably 4 to 5 hours, in the presence of a brominating agent such as pyridinium bromide, perbromide or bromine in an inert solvent which does not take part in the reaction such as carbon tetrachloride at a temperature in the range of from room temperature to a boiling point of the solvent, preferably at or near the boiling point of the solvent used. Suitable solvents are halogenated carbons and mixtures of halogenated carbons and lower alkanols such as chloroform, carbon tetrachloride, dichloroethane, a mixture of methanol and chloroform, and a mixture of ethanol and carbon tetrachloride and the like. The most preferred solvents are chloroform and carbon tetrachloride. The compounds of the formula (IV) are well known in the art and disclosed in E. H. W. Bohme, Z. Valenta, *Tetrahedron Letters*, 1965, 2441. It is preferred to use 1 to 3 moles of brominating agent, more preferably 1 to 1.5 moles, per one mole of the compound of formula (IV). Compound (V) is then reacted with a primary amine of the formula (VI)

 (VI)

wherein $R_2$ is as defined above, to produce the desired starting material of the formula (II).

The compounds of the invention having the formula (I) are basic substances and can form acid addition salts with various organic or inorganic acids. Particularly useful such salts are the pharmaceutically acceptable acid addition salts formed with inorganic acids such as hydrochloric acid, sulfuric acid, phosphoric acid, hydrobromic acid, etc. or organic acids such as oxalic acid, maleic acid, fumaric acid, malic acid, tartaric acid, citric acid, ascorbic acid, etc. These acid addition salts can easily be prepared by the well-known procedures, for example, by adding an equimolar to an excess amount of the acid to a solution of the compound (I) dissolved in an appropriate organic solvent such as isopropanol, acetone and the like.

Both the free bases of the compounds (I) and acid addition salts thereof exhibit a blocking activity on β-adrenergic nerves and therefore are useful as pharmaceuticals for treating disorders in coronary sclerosis such as arrhthmia, tachycardia, angina pectoris, coronary insufficiency, hypertension, etc. Particularly preferred compounds of the formula (I) are following basic compounds and their hydrochlorides, sulfates, phosphates, maleates, fumarates and oxalates:

3-tert-Butyl-5-[(3,4-dihydro-5-carbostyril)oxymethyl]-oxazolidine,
5-[(3,4-Dihydro-5-carbostyril)oxymethyl]-3-isopropyloxazolidine,
3-tert-Butyl-5-[(3,4-dihydro-5-carbostyril)oxymethyl]-2-methyl-oxazolidine,
3-tert-Butyl-5-[(3,4-dihydro-5-carbostyril)oxymethyl]-2-phenyl-oxazolidine,
5-[(1-Ethyl-3,4-dihydro-5-carbostyril)oxymethyl]-3-isopropyloxazolidine,
3-tert-Butyl-2-ethyl-5-[(3,4-dihydro-5-carbostyril)oxymethyl]-oxazolidine, 3-tert-Butyl-5-[(1-benzyl-3,4-dihydro-5-carbostyril)-
oxymethyl]-oxazolidine,
3-tert-Butyl-5-[(1-methyl-3,4-dihydro-carbostyril-
)oxymethyl]-2-propyloxazolidine,
5-[(3,4-Dihydro-5-carbostyril)oxymethyl]-3-isopro-
pyl-2-phenyl-oxazolidine,
3-tert-Butyl-5-[(3,4-dihydro-5-carbostyril)oxyme-
thyl]-2-propyloxazolidine,
2-Ethyl-5-[(3,4-dihydro-5-carbostyril)oxymethyl]-3-
isopropyl-oxazolidine,
3-tert-Butyl-2-ethyl-5-[(3,4-dihydro-5-carbostyril-
)oxymethyl]oxazolidine,
3-tert-Butyl-5-[(1-allyl-3,4-dihydro-5-carbostyril)ox-
ymethyl]oxazolidine,
3-tert-Butyl-5-[(1-methyl-3,4-dihydro-5-carbos-
tyril)-oxymethyl]oxazolidine,
3-tert-Butyl-5-[(3,4-dihydro-5-carbostyril)oxyme-
thyl]-oxazolidinone-(2),
5-[(3,4-Dihydro-5-carbostyril)oxymethyl]-3-iso-
propyloxazolidinone-(2),
3-tert-Butyl-5-[(1-benzyl-3,4-dihydro-5-carbostyril)-
oxymethyl]oxazolidinone-(2),
5-[(1-Ethyl-3,4-dihydro-5-carbostyril)oxymethyl]-3-
isopropyloxazolidinone-(2),
3-tert-Butyl-5-[(1-methyl-3,4-dihydro-5-carbos-
tyril)-oxymethyl]oxazolidinone-(2),
5-[(1-Allyl-3,4-dihydro-5-carbostyril)oxymethyl]-3-
tert-butyloxazolidinone-(2),
3-tert-Butyl-5-[(1-ethyl-3,4-dihydro-5-carbostyril)-
oxymethyl]oxazolidinone-(2).

The present invention is further illustrated by reference to the following examples, but these examples are not to be construed as limiting the scope of the invention. Unless otherwise indicated, all parts, percents, ratios and the like are by weight.

EXAMPLE 1

3.0 g 5-(2-hydroxy-3-tert-butylamino)propoxy-3,4-dihydrocarbostyril and 1.0 g of paraformaldehyde were added to 20 ml of benzene, and the mixture was heated at refluxing temperature for 3 hours while removing the water formed during the reaction from the reaction system. After allowing the reaction mixture to cool, the crystals precipitated were filtered and recrystallized from benzene to obtain 2.4 g of colorless amorphous 3-tert-butyl-5-[(3,4-dihydro-5-carbostyril)oxymethyl]oxazolidine having a melting point of 151° to 153°C.

EXAMPLE 2

3.0 g of 5-(2-hydroxy-3-isopropylamino)propoxy-3,4-dihydrocarbostyryl and 1.0 g of paraformaldehyde were added to 30 ml of toluene, and the mixture was heated at refluxing temperature while removing the water formed during the reaction from the reaction system. The resulting reaction mixture was then concentrated under reduced pressure to dryness, and the residual crystals were recrystallized from cyclohexane to obtain 1.9 g of colorless amorphous 5-[(3,4-dihydro-5-carbostyril)oxymethyl]-3-isopropyloxazolidine having a melting point of 131.5° to 133°C

EXAMPLE 3

2.5 g of 5-(3-tert-butylamino-2-hydroxy)propoxy-3,4-dihydrocarboxyryl and 4.0 g of 90% acetaldehyde were added to 40 ml of benzene, and the mixture was stirred at room temperature for 24 hours. The reaction mixture was filtered to remove any undissolved substances, and the filtrate was concentrated to dryness. The residual crystals were then recrystallized from ligroin to obtain 1.5 g of colorless amorphous 3tert-butyl-5-[(3,4-dihydro-5-carbostyril)oxymethyl]-2-methyl-oxazolidine having a melting point of 136° to 138°C.

EXAMPLE 4

1.5 g of 5-(2-hydroxy-3-tert-butylamino)propoxy-3,4-dihydrocarbostyril and 3.0 g of benzaldehyde were added to 60 ml of benzene, and the mixture was heated at refluxing temperature for 3 hours. After allowing the mixture to stand overnight, the crystals precipitated were filtered and recrystallized from isopropanol to obtain 0.9 g of colorless amorphous 3-tert-butyl5-[(3,4-dihydro-5-carbostyril)oxymethyl]-2-phenyl-oxazolidine having a melting point of 183° to 185°C.

EXAMPLE 5

1.5 g of 1-ethyl-5-(2-hydroxy-3-isopropylamino)-propoxy-3,4-dihydrocarbostyril and 0.7 g of paraformaldehyde were added 20 ml of benzene, and the mixture was heated at refluxing temperature for 4 hours. The resulting mixture was then concentrated under reduced pressure to dryness, and the residue was dissolved in acetone. The solution was then purified by column chromatography using silica gel Wako Gel C-200 to obtain 1.1 g of 5-[(1-ethyl3,4-dihydro-5-carboxtyrilstyril)oxymethyl]-3-isopropyl-oxazolidine as a colorless oil. The infrared absorption spectrum of the product showed characteristic absorptions at 2960 $cm^{-1}$, 1670 $cm^{-1}$, 1200 $cm^{-1}$ and 767 $cm^{-1}$.

EXAMPLE 6

1.5 g of 1-ethyl-5-(2-hydroxy-3-tert-butylamino)-propoxy-3,4-dihydrocarbostyril and 1.0 g of propionaldehyde were added 20 ml of benzene and the mixture was heated at refluxing temperature for 4 hours. The resulting mixture was then concentrated under reduced pressure to dryness and the residue was dissolved in acetone. The solution was then purified by column chromatography using silica gel C-200 to obtain 0.8 g of 3-tert-butyl-2-ethyl5-[(1-ethyl-3,4-dihydro-5-carbostyril-)oxymethyl]-oxazolidine as a colorless oil. The infrared absorption spectrum of the product showed characteristic absorptions at 2950 $cm^{-1}$, 1670 $cm^{-1}$, 1594 $cm^{-1}$, 1196 $cm^{-1}$ and 760 $cm^{-1}$.

EXAMPLE 7

1.3 g of 1-benzyl-5-(2hydroxy-3-tert-butylamino)-propoxy-3,4-dihydrocarbostyril and 0.7 g of paraformaldehyde were added to 20 ml of benzene and the mixture was heated at refluxing temperature for 4 hours. The resulting mixture was then concentrated under reduced pressure to dryness, and the residue was recystallized from ligroin to obtain 0.9 g of colorless amorphous 3-tertbutyl-5-[(1-benzyl-3,4-dihydro-5-carboxtyril)-oxymethyl]oxazolidine having a melting point of 80° to 82°C.

EXAMPLE 8

1.0 g of 5-(2-hydroxy-3-tert-butylamino)propoxy-1-methyl-3,4-dihydrocarbostyril and 0.7 g of butyraldehyde were added to 20 ml of benzene and the mixture was heated at refluxing temperature for 5 hours. The resulting mixture was then concentrated under reduced pressure to dryness and the residue was dissolved in acetone. The solution was then purified by column chromatography using silica gel C-200 to obtain 0.6 g of 3-tert-butyl-5-[(1-methyl-3,4-dihydro-5-carboxtyril)- oxymethyl]-2-propyloxazolidine as a colorless oil. The infrared absorption spectrum of the product showed characteristic absorptions at 2960 cm$^{-1}$, 2870 cm$^{-1}$, 1600 cm$^{-1}$ and 768 cm$^{-1}$.

In the same manner as described in the previous Examples, the following compounds were obtained:

5-[(3,4-dihydro-5-carbostyril)oxymethyl]-3-isopropyl-2-phenyl-oxazolidine having a melting point of 155° to 156.5°C (recrystallized from isopropanol), 3-tert-butyl-5-[(3,4-dihydro-5-carbostyril)oxymethyl]-2-propyl-oxazolidine having a melting point of 119° to 120.5°C (recrystallized from ligroin), 2-ethyl-5-[(3,4-dihydro-5-carbostyril)oxymethyl]-3-isopropyloxazolidine having a melting point of 137° to 139°C (recrystallized from isopropyl), 3-tert-butyl-2-ethyl-5-[(3,4-dihydro-5-carbostyril)oxymethyl]oxazolidine having a melting point of 136° to 138°C (recrystallized from isopropyl), 3-tert-butyl-5-[(1-allyl-3,4-dihydro-5-carbostyril)oxymethyl]-oxazolidine having the following characteristic absorption in the infrared absorption spectrum: 2960 cm$^{-1}$, 1675 cm$^{-1}$, 1598 cm$^{-1}$ and 768 cm$^{-1}$ (purified by silica gel column chromatography), and 3-tert-butyl-5-[(1-methyl-3,4-dihydro-5-carbostyril)oxymethyl]-oxazolidine having the following characteristic absorption in the infrared absorption spectrum: 2950 cm$^{-1}$, 1670 cm$^{-1}$, 1595 cm$^{-1}$, 1207 cm$^{-1}$ and 765 cm$^{-1}$ (purified by silica gel column chromatography).

EXAMPLE 9

2.0 g of 5-(2-hydroxy-3-tert-butylamino)propoxy-3,4-dihydrocarbostyril and 1.3 g of powdered potassium carbonate were added to 70 ml of toluene, and 6 ml of a 30% phosgene solution in toluene was added dropwise to the mixture while heating the mixture at a temperature of 45° to 50°C with stirring. The resulting mixture was further stirred at the same temperature for an additional 8 hours and, after allowing the mixture to cool, the crystals precipitated were filtered. The crystals thus obtained were then dissolved in chloroform and the solution was dried over anhydrous sodium sulfate. The chloroform was then removed by distillation, and the residue was recrystallized from isopropanol to obtain 1.4 g of colorless amorphous 3-tertbu- -5-[(3,4-dihydro-5-carbostyriloxymethyl]-oxazolidinone(2) having a melting point of 219.5° to 221°C.

EXAMPLE 10

2.0 g of 5-(2-hydroxy-3-isopropylamino)propoxy-3,4-dihydrocarbostyril and 1.3 g of powdered potassium carbonate were added to 70 ml of toluene, and 6 ml of a 30% phosgene solution in toluene was added dropwise to the mixture while heating the mixture at a temperature of 50° to 55°C with stirring. The resulting mixture was further stirred at the same temperature for an additional 8 hours and filtered while hot. The filtrate was concentrated under reduced pressure to dryness and the residue was dissolved in chloroform. The resulting solution was washed with water and dried over anhydrous sodium sulfate. The chloroform was then removed by distillation, and the residue was dissolved in acetone. The acetone solution was purified by column chromatography using silica gel C-200 to obtain 1.1 g of 5-[(3,4dihydro-5-carbostyril)oxymethyl]-3-isopropyloxazolidinone-(2) as a colorless viscous material. The infrared absorption spectrum of the product showed characteristic absorptions at 1730 cm$^{-1}$, 1650 cm$^{-1}$, 1590 cm$^{-1}$ and 760 cm$^{-1}$.

EXAMPLE 11

1.0 g of 1-benzyl-5-(2-hydroxy-3-tert-butylamino)-propoxy3,4-dihydrocarbostyril and 0.5 g of sodium carbonate were added to 40 ml of benzene and 3 ml of a 30% phosgene solution in toluene was added dropwise to the mixture at room temperature with stirring. The resulting mixture was further stirred for an additional 24 hours at room temperature and the mixture was filtered to remove any undissolved materials. The filtrate was then concentrated under reduced pressure to dryness and the resulting residue was recrystallized from isopropanol to obtain 0.7 g of 3-tert-butyl-5-[(1-benzyl-3,4-dihydro-5-carbostyril)oxymethyl]-oxazolidinone-(2) as colorless needle-like crystals having a melting point of 152° to 154°C.

EXAMPLE 12

1.0 g of 1-ethyl-5-(2-hydroxy-3-isopropylamino)-propoxy-3,4-dihydrocarbostyril and 0.5 g of powdered potassium carbonate were added to 40 ml of toluene, and 3 ml of a 30% phosgene solution in toluene was added dropwise while stirring. The resulting mixture was further stirred for an additional 8 hours at room temperature and, the mixture was filtered to remove any undissolved materials. The filtrate was then concentrated under reduced pressure to dryness and the resulting residue was dissolved in acetone. The solution was then purified by column chromatography using silica gel C-200 to obtain 0.8 g of 5-[(1-ethyl-3,4-dihydro-5-carbostyril)oxymethyl]-3-isopropyloxazolidinone-(2) as a viscous material. The infrared absorption spectrum of the product showed characteristic absorptions at 1735 cm$^{-1}$, 1665 cm$^{-1}$, 1598 cm$^{-1}$ and 765 cm$^{-1}$.

In the same manner as described in Examples 9 and 12, the following compounds were prepared:

3-tert-butyl-5-[(1-methyl-3,4-dihydro-5-carbostyril)-oxymethyl]-oxazolidinone-(2) having a melting point of 98.5°-100°C (recrystallized from ligroin), 5-[(1-allyl-3,4-dihydro-5-carbostyril)oxymethyl]-3-tertbutyloxazolidinone-(2) having the following characteristic infrared absorptions: 1735 cm$^{-1}$, 1670 cm$^{-1}$, 1595 cm$^{-1}$ and 763 cm$^{-1}$, 3-tert-butyl-5-[(1-ethyl-3,4-dihydro-5-carbostyril)oxymethyl]oxazolidinone-(2) having the following characteristic infrared absorptions: 1738 cm$^{-1}$, 1665 cm$^{-1}$, 1598 cm$^{-1}$ and 765 cm$^{-1}$.

REFERENCE EXAMPLE

The antagonistic activity of the compounds of this invention against isopenaline was determined using the β-blockers screening method (c. E. Powell, I. H. slater : J. Pharmac., 122, 480 (1958).

Male hybrid adult dogs, weighing 13 to 20 Kg were anesthesized with 30 mg/Kg of body weight of pentobarbital sodium administered intravenously. Each of the test compounds was then administered to the anesthesized dog at a dosage level of 10γ or 100 γ/Kg of body weight from the femoral vein and after 5 minutes isoprenaline was administered to the dog through the femoral vein at a dosage level of 0.3 γ/Kg of body weight. The blood pressure and the pulse (H.R.) were then recorded on a polygraph through a pressure transducer and a tachometer operated by the R wave of the electrocardiograph, respectively, to determine % inhibitory activity of the test compound against the pulse increase and the pressure reduction induced by isoprenaline. The results obtained are shown in Table below.

Table

| Test Compound* | Dosage Level (γ/Kg) | Antagonistic Isoprenaline Activity Against (% Inhibition)** | |
|---|---|---|---|
| | | Blood Pressure | Pulse |
| 1 | 10 | 93.1 | 93.7 |
| 2 | 100 | 92.4 | 100 |
| 3 | 100 | 66.7 | 92.1 |
| 4 | 100 | 56.6 | 57.9 |
| 5 | 100 | 83.2 | 80.6 |
| 6 | 100 | 77.8 | 60.2 |
| 7 | 100 | 91.4 | 100 |
| 8 | 100 | 92.3 | 100 |
| 9 | 100 | 60.2 | 51.7 |
| 10 | 100 | 68.0 | 65.2 |

*Test Compound

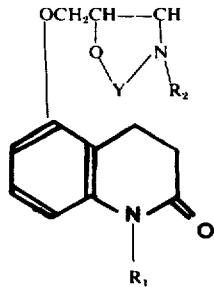

| Compound No. | $R_1$ | $R_2$ | Y |
|---|---|---|---|
| 1 | H | t-butyl | $-CH_2-$ |
| 2 | H | t-butyl | $-CH-$<br>$\|$<br>$C_6H_5$ |
| 3 | ethyl | iso-butyl | $-CH_2-$ |
| 4 | benzyl | t-butyl | $-CH_2-$ |
| 5 | H | iso-propyl | $-CH_2-$ |
| 6 | $CH_3$ | t-butyl | $-CH_2-$ |
| 7 | H | t-butyl | $-C-$<br>$\|\|$<br>$O$ |
| 8 | H | iso-propyl | $-C-$<br>$\|\|$<br>$O$ |
| 9 | ethyl | iso-propyl | $-C-$<br>$\|\|$<br>$O$ |
| 10 | ethyl | t-butyl | $-C-$<br>$\|\|$<br>$O$ |

**The pulse increase and the pressure reduction induced by the administration of isoprenaline alone are referred to as 100%.

Also, the acute toxicity in rat (Wister strain) was determined in a standard manner with respect to representative compounds of this invention. The $LD_{50}$ (50% lethal dose) are as follows:

| Compound | $LD_{50}$ (mg/Kg) | |
|---|---|---|
| | i.v. | p.o. |
| 3-tert-Butyl-5-[(3,4-dihydro-5-carbostyril)oxymethyl]oxazoline | 147.2 | 2000 |
| 3-tert-Butyl-5-[(3,4-dihydro-5-carbostyril)oxymethyl]-2-phenyl-oxazolidine | 163.2 | 2000 |
| 3-tert-Butyl-5-[(3,4-dihydro-5-carbostyril)oxymethyl]oxazolidinone-(2) | 140.0 | 2000 |

While the present invention has been described in detail with reference to the specific embodiments thereof, it is apparent to one skilled in the art that various changes and modifications can be made therein without departing the scope and the spirit of the present invention.

What is claimed is:
1. Oxazolidine and oxazolidinone-(2) compounds represented by the formula (I):

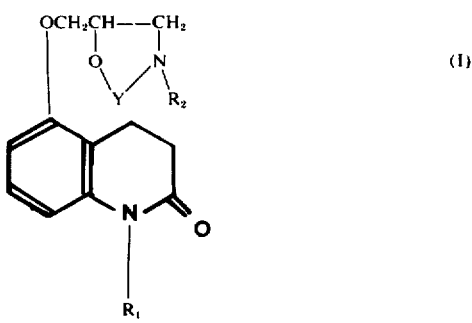

wherein $R_1$ represents a hydrogen atom, a straight or branched chain alkyl group having 1 to 4 carbon atoms, an alkenyl group having 2 to 4 carbon atoms or a phenylalkyl group having 1 to 2 carbon atoms in the alkyl moiety thereof, $R_2$ represents a straight or branched chain alkyl group having 1 to 4 carbon atoms, and Y represents >C=O or >CH—$R_3$ wherein $R_3$ represents a hydrogen atom, a straight or branched chain alkyl group having 1 to 3 carbon atoms or a phenyl group.

2. 3-tert-Butyl-5-[(3,4-dihydro-5-carbostyril)oxymethyl]-oxazolidine, according to claim 1.

3. 5-[(3,4-Dihydro-5-carbostyril)oxymethyl]-3-isopropyl-oxazolidine, according to claim 1.

4. 3-tert-Butyl-5-[(3,4-dihydro-5-carbostyril)oxymethyl]-2-methyl-oxazolidine, according to claim 1.

5. 3-tert-Butyl-5-[(3,4-dihydro-5-carbostyril)oxymethyl]-2-phenyl-oxazolidine, according to claim 1.

6. 5-[(1-Ethyl-3,4-dihydro-5-carbostyril)oxymethyl]-3-isopropyloxazolidine, according to claim 1.

7. 3-tert-Butyl-2-ethyl-5-[(1-ethyl-3,4-dihydro-5-carbostyril)oxy-methyl]-oxazolidine, according to claim 1.

8. 3-tert-Butyl-5-[(1-benzyl-3,4-dihydro-5-carbostyril)-oxymethyl]-oxazolidine, according to claim 1.

9. 3-tert-Butyl-5-[(1-methyl-3,4-dihydro-carbostyril)oxymethyl]-2-propyloxazolidine, according to claim 1.

10. 5-[(3,4-Dihydro-5-carbostyril)oxymethyl]-3-isopropyl-2-phenyl-oxazolidine, according to claim 1.

11. 3-tert-Butyl-5-[(3,4-dihydro-5-carbostyril)oxymethyl]-2-propyloxazolidine, according to claim 1.

12. 2-Ethyl-5-[(3,4-dihydro-5-carbostyril)oxymethyl]-3-isopropyl-oxazolidine, according to claim 1.

13. 3-tert-Butyl-2-ethyl-5-[(3,4-dihydro-5-carbostyril)oxymethyl]oxazolidine, according to claim 1.

14. 3-tert-Butyl-5-[(1-allyl-3,4-dihydro-5-carbostyril)oxymethyl]oxazolidine, according to claim 1.

15. 3-tert-Butyl-5-[(1-methyl-3,4-dihydro-5-carbostyril)-oxymethyl]oxazolidine, according to claim 1.

16. 3-tert-Butyl-5-[(3,4-dihydro-5-carbostyril)oxymethyl]-oxazolidinone-(2), according to claim 1.

17. 5-[(3,4-Dihydro-5-carbostyril)oxymethyl]-3-isopropyloxazolidinone-(2), according to claim 1.

18. 3-tert-Butyl-5-[(1-benzyl-3,4-dihydro-5-carbostyril)-oxymethyl]oxazolidinone-(2), according to claim 1.

19. 5-[(1-Ethyl-3,4-dihydro-5-carbostyril)oxymethyl]-3-isopropyloxazolidinone-(2), according to claim 1.

20. 3-tert-Butyl-5-[(1-methyl-3,4-dihydro-5-carbostyril)oxymethyl]oxazolidinone-(2), according to claim 1.

21. 5-[(1-Allyl-3,4-dihydro-5-carbostyril)oxymethyl]-3-tert-butyloxazolidinone-(2), according to claim 1.

22. 3-tert-Butyl-5-[(1-ethyl-3,4-dihydro-5-carbostyril)-oxymethyl]oxazolidinone-(2), according to claim 1.

* * * * *